(12) United States Patent
Battista

(10) Patent No.: US 9,607,499 B2
(45) Date of Patent: *Mar. 28, 2017

(54) SATELLITE AIDED LOCATION TRACKING WITH USER INTERFACE

(71) Applicant: SkyBitz, Inc., Herndon, VA (US)

(72) Inventor: Rich Battista, Ashburn, VA (US)

(73) Assignee: SkyBitz, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,048

(22) Filed: Apr. 16, 2014

(65) Prior Publication Data

US 2014/0210619 A1    Jul. 31, 2014

Related U.S. Application Data

(63) Continuation of application No. 13/750,125, filed on Jan. 25, 2013, now Pat. No. 8,704,658, which is a continuation of application No. 13/234,757, filed on Sep. 16, 2011, now Pat. No. 8,362,900, which is a continuation of application No. 11/741,236, filed on Apr. 27, 2007, now Pat. No. 8,058,987.

(60) Provisional application No. 60/797,358, filed on May 4, 2006.

(51) Int. Cl.
| | | |
|---|---|---|
| G08B 1/08 | (2006.01) |
| G08B 21/18 | (2006.01) |
| G06Q 10/04 | (2012.01) |
| G06Q 10/08 | (2012.01) |
| G08B 5/22 | (2006.01) |

(52) U.S. Cl.
CPC .......... *G08B 21/18* (2013.01); *G06Q 10/047* (2013.01); *G06Q 10/0833* (2013.01); *G08B 5/22* (2013.01)

(58) Field of Classification Search
CPC ........ G08B 21/18; G08B 5/22; G06Q 10/047; G06Q 10/0833
USPC ..... 340/539.13, 572.1, 573.4, 539.23, 539.2, 340/539.15; 455/456.1, 456.4
See application file for complete search history.

(56) References Cited

U.S. PATENT DOCUMENTS

| | | | | |
|---|---|---|---|---|
| 5,550,738 A | * | 8/1996 | Bailey ............... | G07C 5/085 340/459 |
| 5,949,333 A | * | 9/1999 | Lehmann et al. .......... | 340/571 |
| 6,072,396 A | | 6/2000 | Gaukel | |
| 6,456,936 B1 | * | 9/2002 | Neukirchen ....... | G01C 21/3611 340/988 |
| 6,577,248 B1 | | 6/2003 | Hjelmvik | |
| 6,688,985 B2 | | 2/2004 | Weiss et al. | |
| 6,832,140 B2 | * | 12/2004 | Fan ................... | G01S 5/0027 340/439 |
| 7,042,361 B2 | * | 5/2006 | Kazdin et al. ........... | 340/573.4 |
| 7,486,174 B2 | * | 2/2009 | Battista ................ | G01S 19/34 340/3.71 |

(Continued)

OTHER PUBLICATIONS

SkyBitz InSight User Guide, Version 2.60, Oct. 3, 2004.

*Primary Examiner* — Hoi Lau

(74) *Attorney, Agent, or Firm* — Toering Patents PLLC

(57) ABSTRACT

A satellite aided location tracking and data services with user interface. A graphical user interface is provided that enables users to monitor the status of movable assets. Detailed information in a position history enables the user to obtain status information (e.g., starts and stops) at each position report. This status information promotes visibility into the journey of each movable asset.

19 Claims, 4 Drawing Sheets

(56) References Cited

U.S. PATENT DOCUMENTS

| | | | |
|---|---|---|---|
| 7,498,925 B2 * | 3/2009 | Battista | G08G 1/20 340/425.5 |
| 8,593,276 B2 * | 11/2013 | Doyle | G08B 13/1427 340/539.11 |
| 2003/0171860 A1 * | 9/2003 | Fan | G01S 5/0027 701/32.3 |
| 2005/0104745 A1 | 5/2005 | Bachekler et al. | |
| 2005/0253703 A1 | 11/2005 | He et al. | |
| 2006/0099969 A1 * | 5/2006 | Staton et al. | 455/456.4 |
| 2007/0013526 A1 * | 1/2007 | Kazdin | G08B 21/0261 340/573.4 |
| 2007/0057779 A1 * | 3/2007 | Battista | G01S 19/34 340/425.5 |
| 2007/0057818 A1 * | 3/2007 | Battista | G08G 1/20 340/988 |
| 2007/0176771 A1 * | 8/2007 | Doyle | G08B 13/1427 340/539.13 |
| 2007/0273558 A1 | 11/2007 | Smith et al. | |
| 2007/0285260 A1 * | 12/2007 | Watanabe | 340/573.4 |
| 2008/0108370 A1 * | 5/2008 | Aninye | 455/456.1 |

* cited by examiner

FIG. 5

SATELLITE AIDED LOCATION TRACKING WITH USER INTERFACE

This application is a continuation of non-provisional application Ser. No. 13/750,125, filed Jan. 25, 2013, which is a continuation of non-provisional application Ser. No. 13/234,757 (now U.S. Pat. No. 8,362,900), filed Sep. 16, 2011, which is a continuation of non-provisional application Ser. No. 11/741,236, filed Apr. 27, 2007 (Now U.S. Pat. No. 8,058,987), which claims priority to provisional application No. 60/797,358, filed May 4, 2006. Each of the above-identified applications is incorporated by reference herein, in its entirety, for all purposes.

BACKGROUND

Field of the Invention

The present invention relates generally to monitoring and tracking and, more particularly, to a satellite aided location tracking and data services with user interface.

Introduction

Tracking mobile assets represents a growing enterprise as companies seek increased visibility into the status of movable assets (e.g., trailers, containers, etc.). Visibility into the status of movable assets can be gained through mobile terminals that are affixed to the assets. These mobile terminals can be designed to generate position information that can be used to update status reports that are provided to customer representatives.

Mobile terminals can report this position information to a centralized location via a wireless communication network such as a satellite communication network. In general, satellite communication networks provide excellent monitoring capabilities due to their wide-ranging coverage, which can span large sections of a continent. What is needed, however, is a mechanism for enabling an enterprise to effectively track the status of the movable assets in the field.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5 illustrates an example of a user interface illustrating a tabular listing of a position history for an asset.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
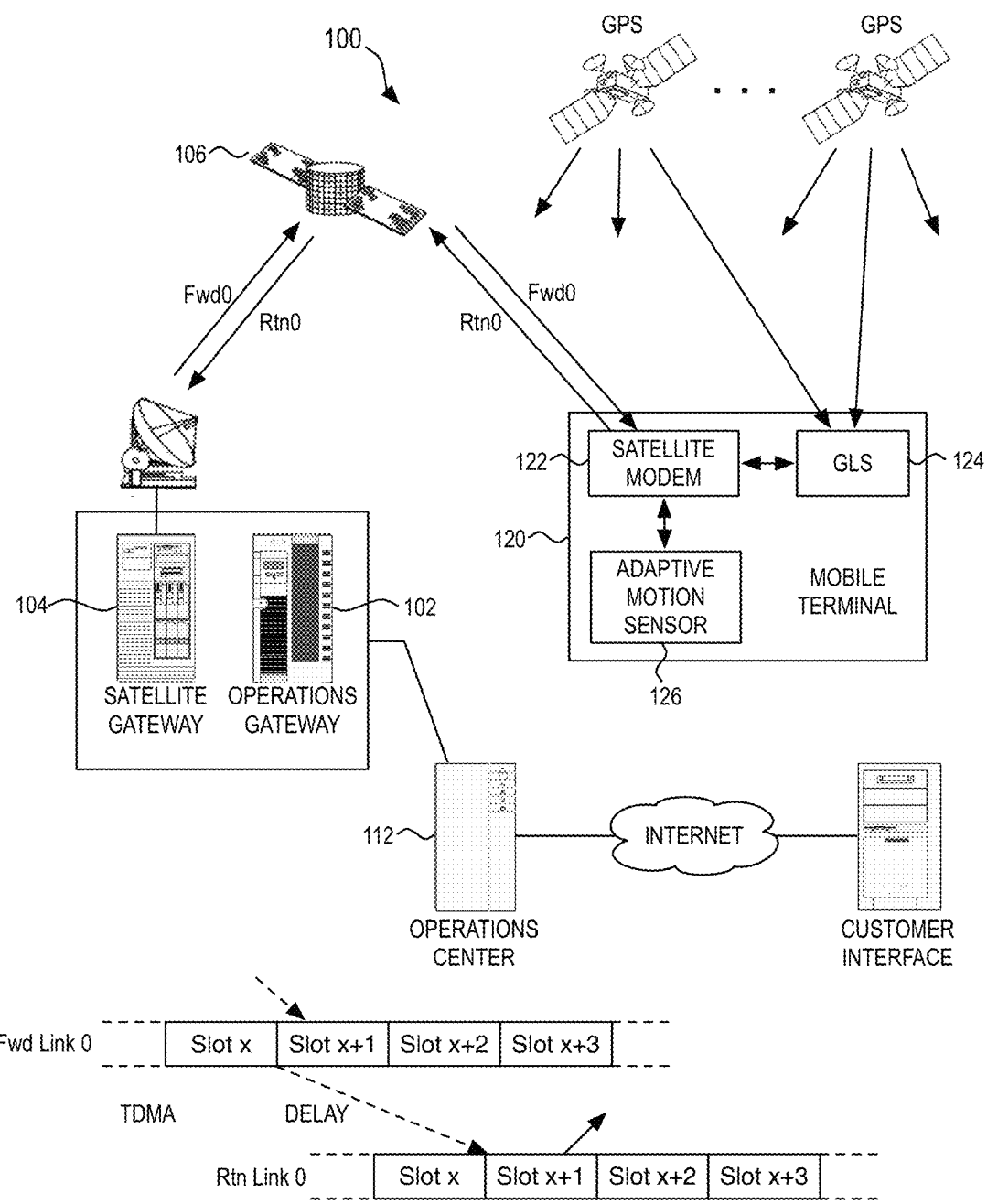
FIG. 1 illustrates an embodiment of a satellite network in communication with a mobile terminal on an asset.

FIG. 1 illustrates an embodiment of an asset tracking system that includes operations gateway 102, communicating with mobile terminal 120 on an asset. As would be appreciated, an asset can be embodied in various forms such as a trailer, a railcar, a shipping container, or the like. Communication between operations gateway 102 and mobile terminal 120 is facilitated by satellite gateway 104 at the ground station and satellite modem 122 in mobile terminal 120. Both satellite gateway 104 and satellite modem 122 facilitate communication using one forward and one return link (frequency) over communications satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112. Operations center 112 can then use the received GPS collection to calculate a position solution. This position solution along with any other status information (both current and historical) can be passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety.

In one embodiment, mobile terminal 120 can also collect sensor measurements from sensors that are positioned at various points on the asset being tracked. In meeting the demand by customers for greater visibility into the status of assets, various sensor types can be used. For example, volume sensors, temperature sensors, chemical sensors, radiation sensors, weight sensors, light sensors, water sensors, truck cab ID indicators, odometer sensors, wheel sensors, etc. can be used to report the condition of cargo being transported, an environment of the asset, a condition of a service vehicle, etc. In general, these various sensors can be used to report status information or the occurrence of any events at the service vehicle to the mobile terminal for transmission to the centralized facility. The position information along with any sensor information can then be reported to the centralized facility periodically, upon request, or upon an occurrence of a detected event at the asset location.

As illustrated in FIG. 1, one of the sensors that can be used is adaptive motion sensor 126, which enables motion-activated location tracking. In general, adaptive motion sensor 126 determines whether an asset is moving or not. Together with the mobile terminal processor and GLS 124, adaptive motion sensor 126 can determine the arrival and departure times of an asset. When an asset begins to move, adaptive motion sensor 126 detects the motion by measuring vibration signals. Adaptive motion sensor 126 then sends a signal to the mobile terminal processor informing it that motion has started. The mobile terminal processor then records the time motion started, and signals to GLS 124 to collect code phase measurements.

The start time and the codephase measurements are sent over the satellite back to the operations center 124 where the codephase measurements are used to solve for a geographical position, and the start time is used to generate the departure time. Conversely, when adaptive motion sensor 126 determines motion has stopped it will again inform the mobile terminal processor to collect time and codephase measurements, and send the information back to operations center 112. Operations center 112 then solves for position, and the stop time is used to generate the arrival time. The arrival and departure times along with their associated geographical locations can be supplied to the user via the Internet.

In the motion-activated location tracking, adaptive motion sensor 126 has a layer of filtering that is capable of filtering out unwanted starts and stops and only transmits true arrival and departure information. Adaptive motion sensor 126 can be configured to only transmit starts or stops when the change in motion is maintained for a configurable percentage of time. In this manner, only accurate arrival and departure time information is transmitted using the mobile terminal with the adaptive motion sensor. This layer of filtering saves on unwanted transmissions, and hence power, bandwidth, and cost.

The mobile terminal can be configured to transmit a position report after the actual arrival or departure times when the motion sensor has reached its "no-motion" or "motion" times, respectively. The "motion" and "no-motion" times can be separately configurable, for example, from one minute up to two hours. For example, if the "motion" time is set at 15 minutes, then the mobile terminal will only transmit departure time information at the expiration of the 15-minute "motion" time period should the motion condition be valid for greater than a configurable percentage of time. This configurability can be used to allow more time to exit an area of interest, or allow more time at rest stops along the way. Once the motion sensor has determined that the mobile terminal has entered a "motion" state, the mobile terminal can then be configured to transmit status reports periodically (e.g., once every X minutes/hours).

The user-configurable "motion sensitivity" can be implemented as the percentage of time the asset needs to remain in motion during the "motion time" to signal motion. This is useful, for example, in maintaining a motion condition while stopped at a traffic light or a rest stop. Conversely, the user-configurable "no-motion sensitivity" can be implemented as the percentage of time the asset needs to remain in no-motion during the "no-motion" time to signal no-motion. This is useful, for example, in maintaining a no-motion condition while moving a trailer within a yard. The motion-activated location tracking is described in greater detail in U.S. patent application Ser. No. 11/377,653, which is incorporated herein by reference in its entirety.

In accordance with the present invention, reporting in the motion-activated location tracking system can be event driven. Various alerts can be configured by the user using a web interface. In one example, an alert can be specified by an identification of an alert type and an action. Examples of alert types include (1) a binary sensor alert that is produced, for example, upon the opening of a trailer door or via a panic switch; (2) a cargo alert that is produced upon detection of a particular trailer volume status (e.g., empty or full); (3) a departure alert that is produced upon a first determination that a calculated mobile terminal position occurs outside of a departure point perimeter; and (4) a destination arrival alert that is produced upon the determination that a calculated mobile terminal position associated with a "no-motion" event occurs inside of a destination point perimeter. Each of these alerts can be triggered based on sensor information. One example of an action to be taken upon triggering of an alert is the initiation of the transmission of a report (e.g., email or telephone notification) to a user.

Figures 2, 4:
FIG. 2 illustrates an embodiment of a user interface for configuring a perimeter.
FIG. 4 illustrates an embodiment of a user interface for searching for an asset.

In one embodiment, a web interface is used to enable a user to configure a departure point perimeter or a destination point perimeter. One example of such a user interface is illustrated in FIG. 2. In this user interface, the user can specify a perimeter using a circle radius around a point such as a landmark, a city/town, or a particular latitude/longitude position. In this example, the user has specified an 8-mile perimeter around the city of Charles Town, W. Va. In another embodiment, the web interface can be used to enable the user to identify a perimeter graphically. As would be appreciated, various perimeter shapes can be used. For example, a user can specify a multi-sided polygon that connects user defined perimeter points. Once the perimeter is established, the area defined by the perimeter can be associated with a location (e.g., arrival and/or departure point).

If an arrival point is specified, then the perimeter defines an arrival location. This arrival location can then be used as a trigger of a user alert. In one embodiment, the system can determine whether a geographical location calculated using the code phase measurements in a mobile terminal position report (e.g., "no-motion" position report) is located within a defined arrival location. If the calculated geographical position is determined to be inside of the arrival location, then an alert can be issued to a user informing the user that the vehicle has arrived at that particular arrival location.

If a departure point is specified, then the perimeter defines a departure location. Here, the system can determine whether a geographical location calculated using the code phase measurements in a mobile terminal "motion" position report is located outside a defined departure location. If the calculated geographical position is determined to be outside of the departure location, then an alert can be issued to a user informing the user that the vehicle has left the particular departure location.

Figure 3:
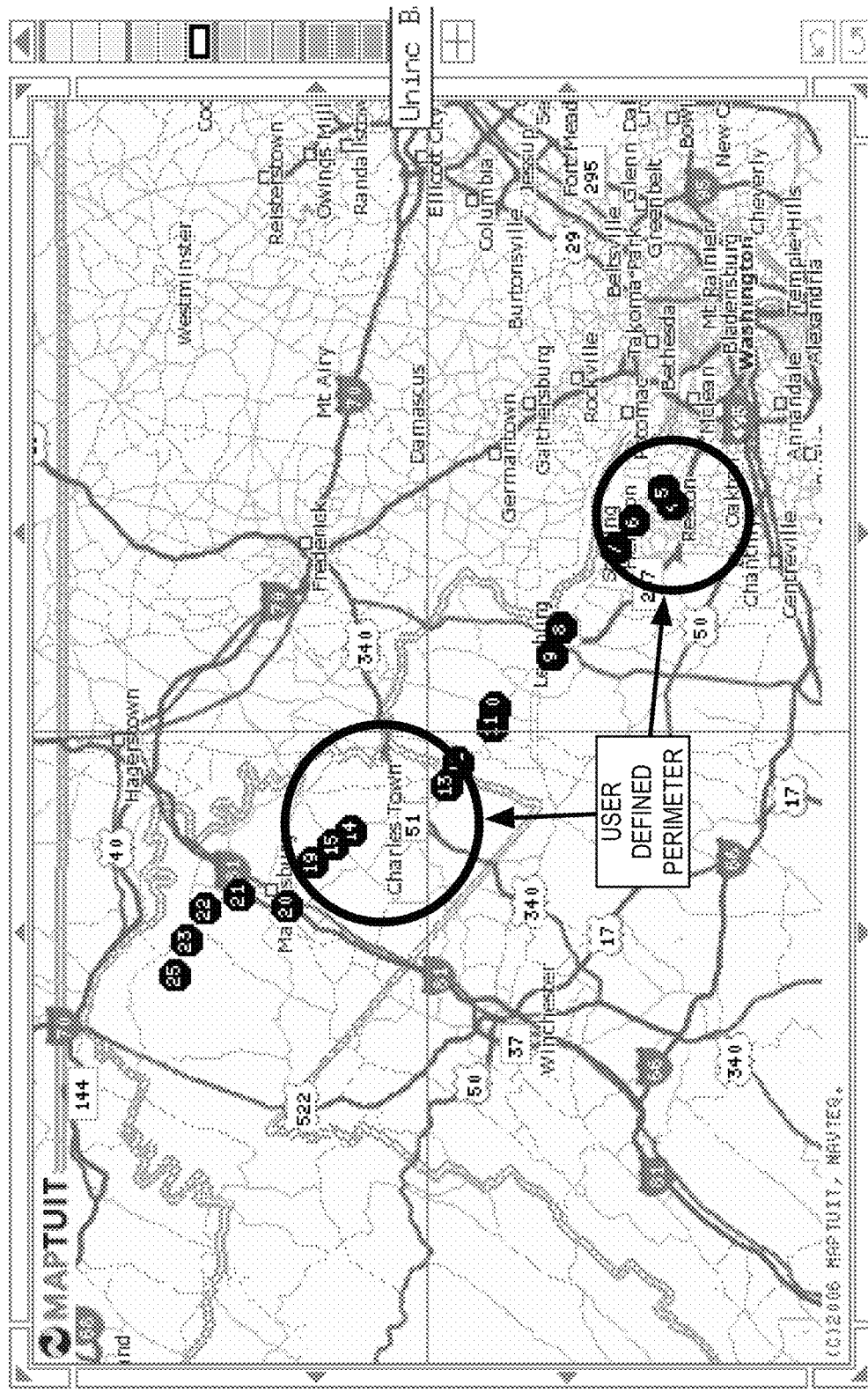
FIG. 3 illustrates an example of a graphical user interface illustrating a position history for an asset.

As would be appreciated, a particular location can be specified as both an arrival location and a destination location. This scenario is illustrated in the example of FIG. 3. Here, the user can specify Charles Town, W. Va. as an arrival and destination location. The system can then track when the asset is located within the defined perimeter and when the asset departs the defined perimeter. This dual specification may be appropriate if the user is tracking a vehicle at some type of intermediate destination.

In one embodiment, various web pages can be used to enable the generation of asset reports. An example of such a user interface is illustrated in FIG. 4. In this asset based search interface, reports can be generated based on one or more searchable criteria such as asset ID, mobile terminal serial number, and user-defined groups. The query can also include the specification of the latest position and a position history. In another example, the search can be based on distance and/or time proximity to particular locations such as landmarks, city/towns, or particular latitude/longitude coordinates. In yet another example, the search can be based on an event, status (e.g., moving, stopped, etc.), asset type (e.g., truck, car, railcar, etc.), time period, etc. In general, the various searchable criteria would enable the user to inventory the assets that are being tracked.

As illustrated in FIG. 3, position reports can include street-level detail. These position reports can be specified to show the current location or position history for one or more assets being tracked. In general, the principles of the present invention enable the generation of reports for tracking multiple assets by showing a distribution of assets by location (e.g., state, city/town, user-defined location, etc.) in graphical, table or other organized form.

Figure 5:
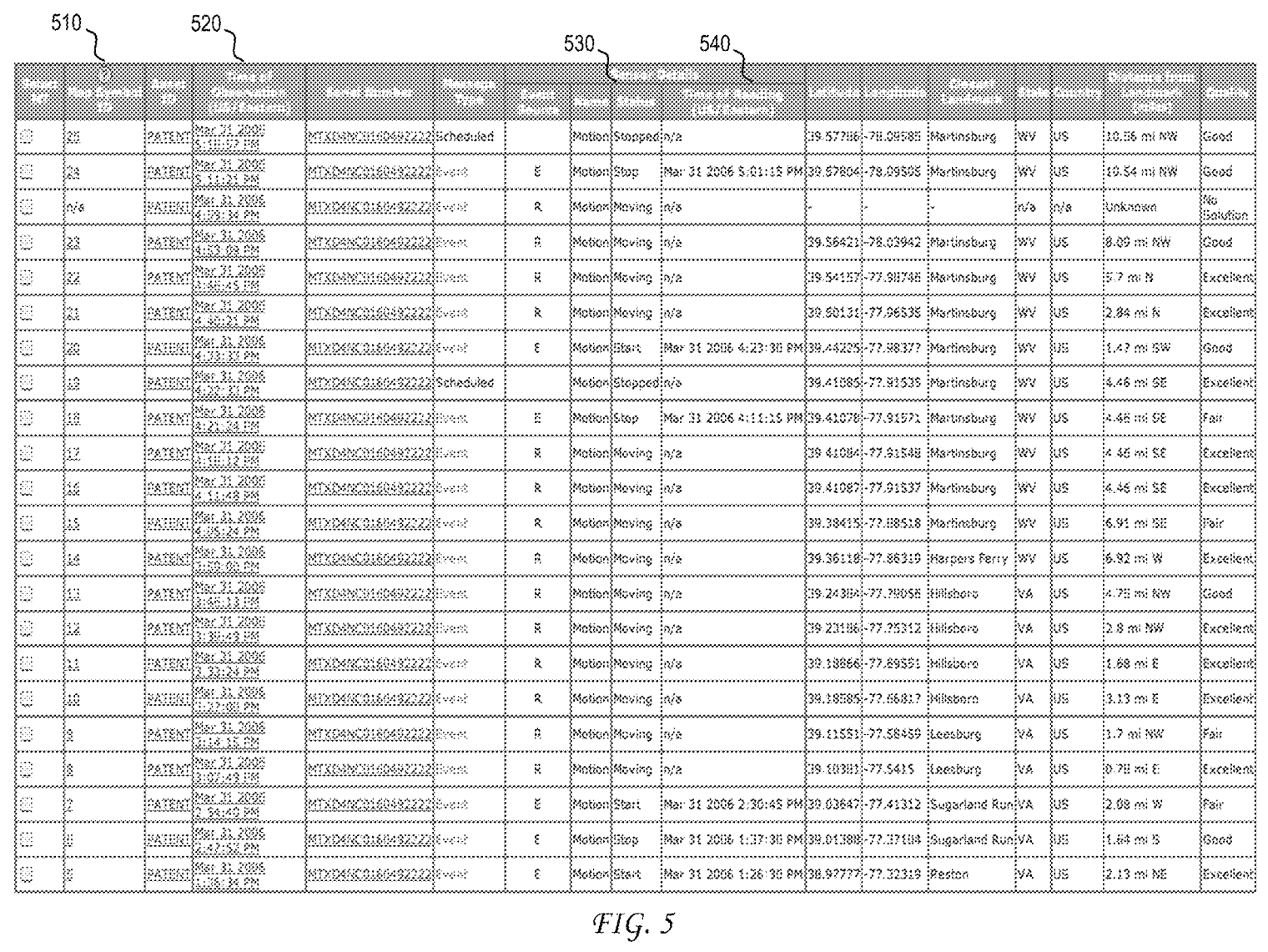

An example of a table report is illustrated in FIG. 5. As illustrated, each row of the example table report is associated with a position report. These position reports are numerically identified in column 510 with numerical identifiers that are correlated to the graphical display in FIG. 3. In this manner, the user can quickly gain visibility into the details for each position in the position history.

One of the details that can be provided is the status information included in row 530. In the example of FIG. 5, the status information is designed to provide detailed information regarding the movement or non-movement of the asset. Consider first the position report detailed by the row having ID 7 in column 510. This position report has a listed status in row 530 of "Start". More specifically, column 540 indicates the time of reading (2:30:45 PM), which is distinct from the time of observation (2:54:40 PM) at column 520. This difference is attributable to the "motion" time period that has been configured for the asset. As noted above, a first detection of movement by the adaptive motion sensor will trigger a collection of position measurements. If the asset remains in a motion condition for greater than a percentage of time for the "motion" time period, then the mobile terminal will report the motion event, including the time motion was first detected. This distinction between measurement time and reported time is reflected by columns 540 and 520, respectively. It is a feature of the present invention that the time of a true start event can be displayed without the noise of all starts/stops experienced by the asset.

If the asset maintains a motion condition, then the status of the asset in column 530 can be listed as "Moving". This condition can be maintained even though the asset makes various incidental stops (e.g., traffic lights). These incidental stops are filtered out due to the failure to remain stopped for greater than a percentage of time in a "no motion" time period. As illustrated in the graphical display of FIG. 3, the first instance of a position report (ID 8) outside of a defined departure point perimeter can trigger a departure alert.

In the current example, the asset maintains a "Moving" status until the position report at ID 18, which has a status of "Stop". Again, the time of reading (4:11:15 PM) at column 540 is distinct from the time of observation (4:21:24 PM) at column 520. In this case, the stopped condition is maintained for only a short period of time, such as a rest stop along the way to the final destination. This is seen by the position report at ID 20, which as a status of "Start". Here, the time of reading is 4:23:30 PM, only 12 minutes 15 seconds after the vehicle stopped. From this intermediate stop, the asset continues to its final destination as indicated by the position report of ID 24.

As has been described, the reporting mechanisms of the present invention enable an enterprise to accurately monitor and track the exact lengths of time that an asset is in a stopped or moving state. This granularity in report detail can be critical to accurately attributing the various costs that are associated with asset transport.

It should also be noted that the report illustrated in the example of FIG. 5 is not limited to event information associated with a motion sensor. Other event information generated by other sensors can also be included in the report. For example, the readings of a temperature sensor can be included in a separate column to track the interior temperature of a refrigerated trailer. This would enable the carrier to verify that the proper environment condition within the trailer has been met throughout the asset transport. Any variances in the measured temperature can also be included in the report.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   receiving, via a communications network, a report from an asset, the report transmitted by the asset when it is determined that the asset achieved a moving condition, the determination based on an analysis of a first non-zero amount of time that the asset is moving and a second non-zero amount of time that the asset is stationary; and
   initiating a transmission of a notification message to a user that the asset is moving after receipt of the report from the asset.

2. The method of claim 1, wherein the report includes position information.

3. The method of claim 2, wherein the position information is GPS code phase measurements.

4. The method of claim 1, further comprising determining whether a determined position of the asset is outside of a perimeter associated with a departure location.

5. The method of claim 1, further comprising transmitting a history of the asset via a web interface, the history including an event associated with a time of day indication included in the report.

6. The method of claim 1, wherein the moving condition is based on a determination that the first non-zero amount of time is greater than the second non-zero amount of time by a threshold amount.

7. The method of claim 1, wherein the first non-zero amount of time and the second non-zero amount of time are measured during the same predefined time period.

8. The method of claim 1, wherein the notification message is sent via email.

9. The method of claim 1, wherein the notification message is sent via telephone.

10. A method, comprising:
    receiving, via a communications network, a report from an asset, the report transmitted by the asset when it is determined that the asset achieved a first operating condition, the determination based on an analysis of a first non-zero amount of time that the asset operated in a first state associated with the first operating condition and a second non-zero amount of time that the asset operated in a second state associated with the second operating condition; and
    initiating a transmission of a notification message to a user that the asset achieved the first operating condition after receipt of the report from the asset.

11. The method of claim 10, wherein the first operating condition is a moving condition and the second operating condition is a non-moving condition.

12. The method of claim 10, wherein the report includes position information.

13. The method of claim 12, wherein the position information is GPS code phase measurements.

14. The method of claim 12, further comprising determining whether a determined position of the asset is outside of a perimeter associated with a departure location.

15. The method of claim 10, further comprising transmitting a history of the asset via a web interface, the history including an event associated with a time of day indication included in the report.

16. The method of claim 11, wherein the moving condition is based on a determination that the first non-zero amount of time is greater than the second non-zero amount of time by a threshold amount.

17. The method of claim 11, wherein the first non-zero amount of time and the second non-zero amount of time are measured during the same predefined time period.

18. The method of claim 10, wherein the notification message is sent via email.

19. The method of claim 10, wherein the notification message is sent via telephone.

* * * * *